United States Patent Office 2,708,724
Patented May 17, 1955

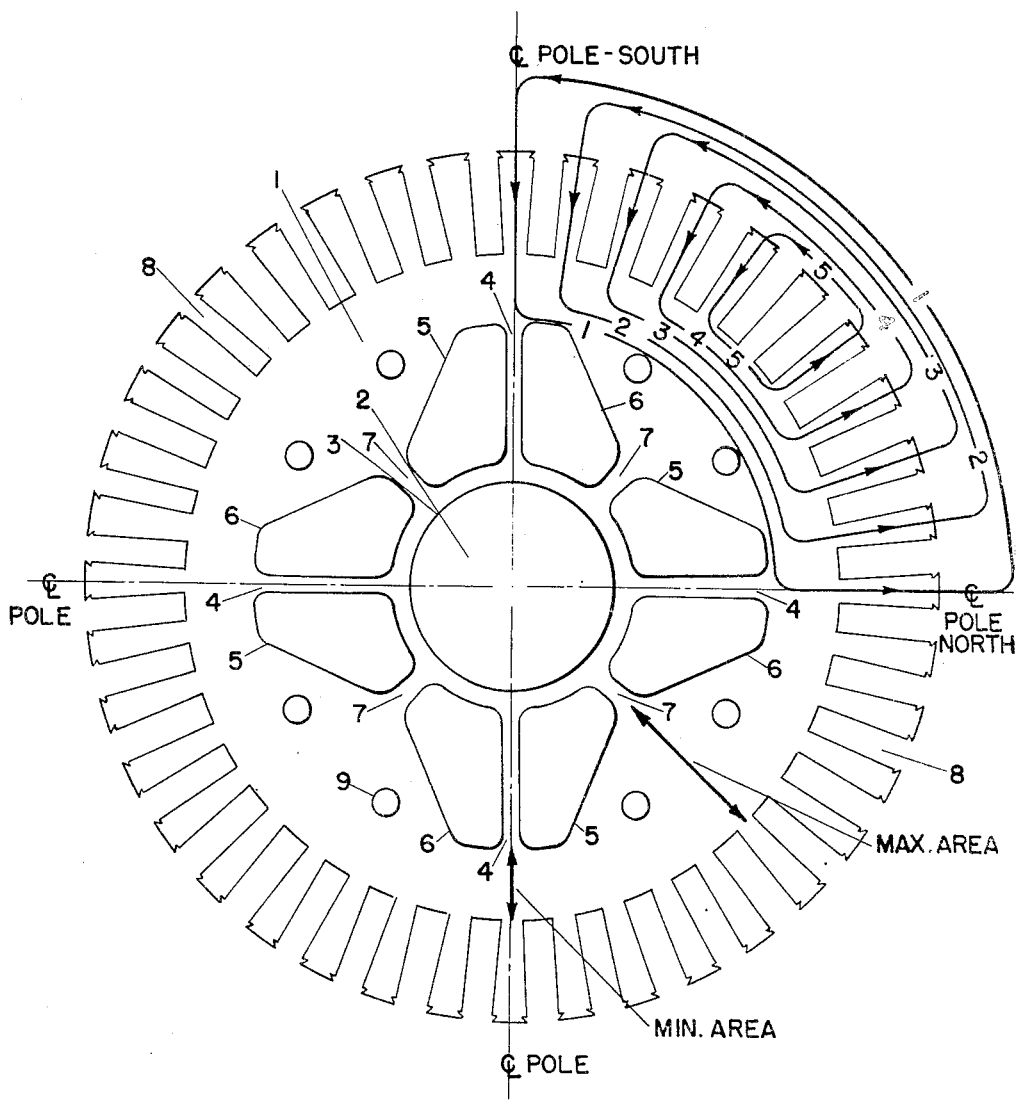

2,708,724
ROTOR LAMINATION FOR ROTATING ELECTRICAL MACHINES

Cecil G. Martin and Robert J. Shafranek, Cleveland, Ohio, assignors to Jack & Heintz, Inc., Cleveland, Ohio, a corporation of Delaware Application May 19, 1952, Serial No. 288,614

2 Claims. (Cl. 310—261)

This invention relates to improvements in rotor laminations for rotating electrical machines.

The conventional practice in such electrical machines as alternators is to provide a rotor construction consisting of a series of laminations, each with a large central circular opening and to have the series of laminations pressed on to a spider or to use cylindrical openings with surrounding supporting ribs. In such a construction when the cooling air is passed through the rotor provides for inefficient cooling air flow passages.

One of the primary objects of our invention is to provide a rotor house series of laminations and is so designed as to improve and obtain the maximum effectiveness of cooling air passing through the alternator rotor and reducing the rotor weight without reducing the effective iron area in the magnetic circuit.

Generally speaking, we propose to so design the laminations that the shape of the openings will be such that the effective iron area between the top of the opening and the bottom of the winding slots varies with the varying flux in that portion so that flux density will be constant for the iron section for the complete pole arc. In addition, we propose to place the openings closer to the rotor winding slots so as to reduce the weight of the rotor, increase cooling air flow through the rotor by means of the larger openings and to improve air cooling by directing the cooling air in a path closer to the rotor winding slots. We also propose to employ ribs that connect the mounting hub portion of the laminations to the main section of the lamination so that the ribs will act as heat transfer fins.

With the foregoing and other objects in view, the invention resides in the combination of parts and in the details of construction hereinafter set forth in the following specification and appended claims, certain embodiments thereof being illustrated in the accompanying drawings, which is a view in elevation of one rotor lamination.

Referring to the drawing, the main body of the rotor lamination is shown at 1 having a central opening 2 inside of the mounting hub 3 with relatively long ribs 4 between each pair of radially elongated openings 5 and 6 and relatively short ribs between opposite adjacent faces of openings 5 and 6. The rotor lamination is provided throughout its periphery with equally spaced peripheral slots 8 to receive rotor windings. The lamination is also provided with a series of small openings 9 to receive suitable mounting securing means.

In this manner we are able to considerably reduce the weight of the rotor by providing its laminations with greater air openings. In addition, the series of openings 5 and 6 provide for greater air flow and cooling effect. Moreover, the radially outward extremities of the openings 5 and 6 are closer to the bottom of the winding slots for better cooling effect which cooling effect is enchanced by the presence of the rotating fins 4 and 7.

In addition, the shape of the openings in the lamination is so designed that the effective iron area between the top of the opening and the bottom of the slot varies with the varying flux in that portion so that the flux density is constant for the iron section for the complete pole arc.

For purposes of illustration there are indicated in the drawing lines of flux labeled 1, 2, 3, 4 and 5 and also north and south polarity. The lines of magnetic force come out of the north pole, cross the gap into the stator line and return to the south pole, completing the path through the inner portion of the lamination, as indicated in the flux lines labeled 1, 2, 3, 4 and 5. They exit from the teeth in one pole and enter the teeth in the other pole as shown. The area below the winding slots serves as the return path for the flux. At the dividing line between the poles, the drawing shows that there are 5 lines of force passing through the iron below the slots. As we move from the dividing line between the poles to the center line of poles, the flux lines in the same portion of the lamination are reduced from 5 to 4 to 3 to 1 and then to 0 at the pole center line. The flux density is equal to the flux lines divided by the area of the iron. Since the number of lines decreases, moving from the pole dividing line to the pole center line, the iron area of the lamination may be reduced and still maintain the same density. In other words, we decrease the iron area with the decreasing flux and keep the density constant. The maximum area occurs at the dividing line between the poles and the minimum area occurs at the pole center line. The result is the iron is removed where it is needed and some added where it is needed. This results in a lamination surface area for heat dissipation and allows the air to reach closer to the windings in the peripheral slots where it is needed for cooling purposes.

We claim:

1. In a rotor lamination for the rotor of an electrical machine in which the rotor has a direct current field, said lamination having a series of peripheral slots for receiving rotor windings and a central aperture with a surrounding mounting hub for said lamination, said lamination having a series of pairs of angular symmetrical openings, each pair of which is disposed to extend radially outwardly of said hub, each pair openings having a relatively narrow rib therebetween and extending radially outward from said hub between each pair of said series of openings, each of said openings being formed to progressively converge to an outer extremity which is relatively close to the bottom of the peripheral winding slots of said lamination adjacent thereto and having a relatively straight side opposite its adjacent rib.

2. In a rotor lamination for the rotor of an electrical machine in which the rotor has a direct current field, said lamination having a series of peripheral slots for receiving rotor windings and a central aperture with a surrounding mounting hub for said lamination, said lamination having a series of pairs of angular symmetrical openings disposed radially outwardly of said hub, each pair of openings having a relatively narrow rib therebetween and extending radially outward from said hub between each pair of said series of pairs of openings, each of said openings being formed to progressively converge radially to an outer extremity which is relatively close to the bottom of the peripheral winding slots of said lamination adjacent thereto and having a relatively straight side opposite its adjacent rib so that the effective iron area between the outer extremity of the openings and the bottom of the winding slots will vary with the varying flux in that portion and so the openings and radiating ribs form a means for cooling air and a heat dissipating transfer means adjacent the lamination slots and windings therein.

References Cited in the file of this patent

UNITED STATES PATENTS

| 890,577 | Richards | June 9, 1908 |
| 1,173,089 | Bergman | Feb. 22, 1916 |
| 1,292,551 | Wilson | Jan. 28, 1919 |
| 1,957,551 | Nierlich | May 8, 1934 |